US012354490B2

(12) United States Patent
Kasinec et al.

(10) Patent No.: US 12,354,490 B2
(45) Date of Patent: Jul. 8, 2025

(54) METHOD AND SYSTEM FOR MONITORING AN OBJECT IN THE ENVIRONMENT OF AN AIRCRAFT

(71) Applicant: Evitado Technologies GmbH, Hamburg (DE)

(72) Inventors: Alexander Thomas Kasinec, Hamburg (DE); Andrew Charles Moakes, Hamburg (DE); Amos Lamar Smith, III, Hamburg (DE)

(73) Assignee: Evitado Technologies GmbH, Hamburg (DE)

( * ) Notice: Subject to any disclaimer, the term of this patent is extended or adjusted under 35 U.S.C. 154(b) by 177 days.

(21) Appl. No.: 17/798,380

(22) PCT Filed: Feb. 10, 2021

(86) PCT No.: PCT/EP2021/053244
§ 371 (c)(1),
(2) Date: Jan. 31, 2023

(87) PCT Pub. No.: WO2021/160695
PCT Pub. Date: Aug. 19, 2021

(65) Prior Publication Data

US 2023/0154344 A1 May 18, 2023

(30) Foreign Application Priority Data

Feb. 10, 2020 (DE) ........................... 10202003298.6

(51) Int. Cl.
*G08B 21/00* (2006.01)
*G08G 5/04* (2006.01)

(52) U.S. Cl.
CPC ...................................... *G08G 5/04* (2013.01)

(58) Field of Classification Search
CPC ........... G08G 5/04; G08G 5/065; G08G 5/045
See application file for complete search history.

(56) References Cited

U.S. PATENT DOCUMENTS 7,616,676 B2 11/2009 McCorkle
10,043,404 B2 * 8/2018 Ell ............................ G06T 7/50
(Continued)

FOREIGN PATENT DOCUMENTS

CN 115380316 A 11/2022
EP 2713180 A1 4/2014
(Continued)

OTHER PUBLICATIONS

International Search Report for International Patent Application No. PCT/EP/2021/053244; European Patent Office; Rijswijk, Netherlands; date of mailing Jul. 12, 2021.
(Continued)

*Primary Examiner* — Toan N Pham
(74) *Attorney, Agent, or Firm* — Thomas E. Lees, LLC

(57) ABSTRACT

A method for monitoring an object (20) in the environment of an aircraft (10) on the ground (2), having the steps of: transmitting a communication signal between a communication device arranged on the object (20), in particular a land vehicle, and at least one communication device spatially allocated to the aircraft (10) on the ground (2), and determining spatial location information relating to the object (20) on the basis of the transmitted communication signal. In addition, a device having an interface which is configured to read in data based on the communication signal transmitted between the communication devices, and a determination unit which is configured to determine spatial location information relating to the object (20) on the basis of the data which have been read in. Furthermore, a system for monitoring an object (20) in the environment of an aircraft (10) on the ground (2), having such a device.

19 Claims, 6 Drawing Sheets

(56) References Cited

U.S. PATENT DOCUMENTS

| | | | | |
|---|---|---|---|---|
| 10,274,595 | B2 | 4/2019 | Kirk | |
| 10,553,123 | B2 * | 2/2020 | Pesik | G08G 5/0021 |
| 11,668,815 | B2 * | 6/2023 | Prados | G01S 13/867<br>342/54 |
| 2010/0109936 | A1 * | 5/2010 | Levy | G08G 5/0013<br>340/961 |
| 2011/0121998 | A1 | 5/2011 | Glover | |
| 2016/0351061 | A1 * | 12/2016 | Lamkin | G08G 5/0021 |
| 2017/0243498 | A1 | 8/2017 | Reddy et al. | |
| 2018/0093769 | A1 | 4/2018 | Sequeira et al. | |
| 2019/0027051 | A1 * | 1/2019 | Veronesi | G08G 5/0021 |
| 2020/0013301 | A1 * | 1/2020 | Vana | G08G 5/0043 |

FOREIGN PATENT DOCUMENTS

| | | | |
|---|---|---|---|
| EP | 3486888 | A1 | 5/2019 |
| WO | 2019086588 | A2 | 5/2019 |
| WO | 2021160695 | A1 | 8/2021 |

OTHER PUBLICATIONS

International Preliminary Report on Patentability for International Patent Application No. PCT/EP2021/053244, The International Bureau of WIPO, 34, chemin des Colombettes, 1211 Geneva 20, Switzerland; date of mailing Aug. 11, 2022.

Office Action for German Patent Application No. 10 2020 103 298.6; Deutsches Patent- und Markenamt, Zweibrückenstraße 12, 80331 München, Germany; date of mailing Sep. 24, 2020.

Search Report for Singapore Application No. 11202252044F; Intellectual Property Office of Singapore, 1 Paya Lebar Link #11-03, PLQ1, Paya Lebar Quarter, Singapore 408533; date of completion of search Dec. 20, 2024.

Decision to Grant under Article 97(1)EPC for European Application No. 21705457.6; European Patent Office, 80298 Munchen, Germany; dated Mar. 6, 2025.

First Office Action for Chinese Application No. 2021800277328; China National Intellectual Property Administration; 6, Xitucheng Lu, Haidian District, Beijing 100088, China; dated May 31, 2023.

Second Office Action for Chinese Application No. 2021800277328; China National Intellectual Property Administration; 6, Xitucheng Lu, Haidian District, Beijing 100088, China; dated Mar. 1, 2024.

Notice of Allowance for Chinese Application No. 2021800277328; China National Intellectual Property Administration; 6, Xitucheng Lu, Haidian District, Beijing 100088, China; dated Jul. 1, 2024.

Certificate of Patent for Chinese Application No. 2021800277328; China National Intellectual Property Administration; 6, Xitucheng Lu, Haidian District, Beijing 100088, China; dated Aug. 20, 2024.

Decision to Grant for German Application No. 102020103298.6; German Patent and Trademark Office; dated Aug. 30, 2023.

Patent Certificate for German Application No. 102020103298.6; German Patent and Trademark Office; dated Dec. 14, 2023.

Invitation to submit a copy of the search results or a declaration that the search results are not available, pursuant to Rule 70b(1)EPC for European Application No. 21705457.6; European Patent Office, 80298 Munchen, Germany; dated May 9, 2023.

Communication under Rule 71(3)EPC for European Application No. 21705457.6; European Patent Office, 80298 Munchen, Germany; dated Sep. 23, 2024.

Notification of Publication for European Application No. 21705457.6; European Patent Office, 80298 Munchen, Germany; dated Nov. 23, 2022.

* cited by examiner

METHOD AND SYSTEM FOR MONITORING AN OBJECT IN THE ENVIRONMENT OF AN AIRCRAFT

TECHNICAL FIELD

The invention relates to a method for monitoring an object in the environment of an aircraft. The invention also relates to a device and a system for monitoring an object.

PRIOR ART

It is known practice to monitor the environment of a land vehicle using sensors which can be fitted to the land vehicle for this purpose. On the basis of such monitoring of the environment, objects in the environment of the land vehicle can be detected. Damage caused by objects in the environment of a land vehicle can therefore be avoided. Aircraft on the ground may also be damaged by objects in the environment thereof. However, it may not be possible or desirable to fit sensors for monitoring such objects to an aircraft.

BRIEF SUMMARY

In one aspect, the invention relates to a method for monitoring an object in the environment of an aircraft on the ground. The method can be carried out in order to monitor an object inside a building and/or outside a building. In other words, the method can be carried out indoors or outdoors.

The object may be a moving object or a stationary object. The object may be a vehicle, in particular a land vehicle, for example an apron vehicle. The apron vehicle may be a vehicle for transporting luggage, goods or food on an apron of an airport. The object may also be a machine or a robot. Furthermore, the object may also be a living being. In order to monitor the object, the method may comprise, as steps, capturing the object and/or detecting the object.

The aircraft on the ground may be stationary, wherein the aircraft may be in a position of rest or in a parked position. Each of these positions may also be a stationary or static position of the aircraft. The aircraft may be in the position of rest or in the parked position temporarily, for example for handling the aircraft, or for a longer period, for example for servicing or producing the aircraft. The aircraft may be inside a building, for example inside a hangar or a production hall, or outside a building, in other words indoors or outdoors. It is also conceivable for the aircraft on the ground to alternatively also be moving, in which case the aircraft can then currently be in a movement position. The method may comprise, as a step, capturing and/or detecting a position of rest or a parked position of the aircraft on the ground. Alternatively or additionally, the method may comprise, as a further step, capturing and/or detecting a movement or a movement position of the aircraft on the ground.

The aircraft on the ground may be on an apron for handling, maneuvering, turning off, parking or servicing the aircraft. The aircraft on the ground may be at a gate or parked there. The aircraft on the ground may alternatively also be on a runway for maneuvering the aircraft. The aircraft may be an airplane, an airship or a helicopter. For example, the aircraft may be a passenger aircraft, an air taxi or a glider.

The method may comprise, as a step, transmitting a communication signal between a communication device arranged on the object and at least one communication device spatially allocated to the aircraft on the ground.

The transmission of the communication signal may comprise communicating the communication signal between the communication devices. Transmission may comprise emitting and/or receiving the communication signal by means of the communication device arranged on the object and/or by means of the at least one communication device spatially allocated to the aircraft on the ground. At least one of the communication devices may therefore be a signal transceiver or a transmitting and receiving unit for transmitting the communication signal.

If a multiplicity of communication devices, that is to say at least two communication devices, are spatially allocated to the aircraft on the ground, the same communication signal can be transmitted between the communication device arranged on the object and the multiplicity of communication devices spatially allocated to the aircraft. Alternatively, a communication signal can then also be respectively transmitted between the communication device arranged on the object and in each case one communication device of the multiplicity of communication devices spatially allocated to the aircraft.

The communication device spatially allocated to the aircraft on the ground may be a device which is separate from the aircraft. In a spatially allocated state of the communication device, it may be arranged at a distance from the aircraft. The communication device may be arranged on the aircraft or spatially separate from the latter. The communication device may be arranged on an object which is separate from the aircraft. Provision is not made for the communication device spatially allocated to the aircraft on the ground to participate in the flight operation of the aircraft in the air in order to carry out the method. Rather, the communication device spatially allocated to the aircraft on the ground may be a device which is used by ground staff to handle or service the aircraft only on the ground.

As a further step, the method may comprise determining spatial location information relating to the object on the basis of the transmitted communication signal. The determining step may comprise determining the spatial location information relating to the object by means of a signal processing method, for example determining a propagation time of the transmitted communication signal. For this purpose, the method may comprise, as further steps, generating and/or evaluating the transmitted communication signal in order to determine the spatial location information relating to the object by means of the signal processing method. Alternatively or additionally, the transmitted communication signal may be a signal which has information relating to the spatial location of the object. For this purpose, the method may comprise, as further steps, modulating, emitting and/or receiving the information relating to the spatial location of the object.

The determining step may be carried out by a monitoring device. For this purpose, the monitoring device may have a determination unit which may be configured to determine the spatial location information relating to the object according to the determining step. The communication device arranged on the object and/or the at least one communication device spatially allocated to the aircraft on the ground may have the monitoring device and/or the determination unit or may be configured as such. A single communication device may have the monitoring device and/or the determination unit. Alternatively, the monitoring device and the determination unit may be distributed over at least two arbitrary communication devices, wherein the monitoring device and/or the determination unit may be in the form of a distributed determination system for determining the spatial location information relating to the object. The monitoring device or the determination unit may also be in the form of a device which is separate from the communication devices and can communicate with at least one of the communication devices in order to determine the spatial location information relating to the object.

The spatial location information relating to the object may have at least one of a position of the object and an orientation of the object. The spatial location information may be spatial location information relative to the aircraft. For example, the spatial location information relating to the object may have at least one of a relative position of the object based on the aircraft and a relative orientation of the object based on the aircraft.

The present invention therefore makes it possible to monitor an object in the environment of an aircraft on the ground without an environment capture sensor being preassembled on or fitted to the aircraft. In contrast, within the scope of the invention, the location of the object in the environment of the aircraft can be first of all already determined on the basis of at least one communication device spatially allocated to the aircraft and then monitored. In further embodiments of the invention, a potential collision of an object with the aircraft can therefore be determined, for example, and/or a collision which has taken place between an object and the aircraft can be detected.

According to one embodiment of the method, the step of determining spatial location information relating to the object comprises determining relative spatial location information relating to the object based on the aircraft on the ground on the basis of the transmitted communication signal. The relative spatial location information relating to the object may be or have a relative position of the object based on the aircraft on the ground. As an alternative or in addition to a relative position, the relative spatial location information relating to the object may be or have a relative orientation of the object based on the aircraft on the ground. The relative spatial location information relating to the object may be determined in a location system or coordinate system relating to the aircraft. The spatial location information relating to the object can therefore be determined in a local coordinate system or in a coordinate system relating to the aircraft. A current location of the object can therefore be monitored based on a current location of the aircraft. Furthermore, it is also possible to monitor a current spatial orientation of the object based on a current location of the aircraft. For example, it is possible to determine whether the object is currently in a predefined safety area around the aircraft or whether the object is moving toward said area.

According to a further embodiment of the method, it may comprise, as a further step, determining relative spatial allocation information relating to the at least one communication device spatially allocated to the aircraft on the ground with respect to the aircraft. The relative spatial allocation information may have relative spatial location information, for example a relative position and/or a relative orientation, of the at least one communication device spatially allocated to the aircraft on the ground with respect to the aircraft. The relative spatial allocation information can be determined in the location system relating to the aircraft or the local coordinate system. The relative spatial allocation information may be determined by means of a sensor or a user input. The sensor may be arranged on the at least one communication device spatially allocated to the aircraft on the ground.

According to a further embodiment of the method, the determining step is carried out on the basis of current spatial location information relating to the aircraft on the ground and/or on the basis of a predetermined geometry model of the aircraft on the ground. The current spatial location information relating to the aircraft may have a position and/or an orientation of the aircraft in a superordinate or global coordinate system. The spatial location information relating to the object can therefore be determined in a superordinate or global coordinate system. The determining step may also be based on the basis of the determined relative spatial allocation information relating to the at least one communication device spatially allocated to the aircraft on the ground. The current spatial location information relating to the aircraft on the ground and the relative spatial allocation information relating to the at least one communication device spatially allocated to the aircraft on the ground can therefore be combined in order to determine the spatial location information relating to the object in the superordinate or global coordinate system on the basis of the transmitted communication signal.

The predetermined geometry model of the aircraft on the ground may have a contour, in particular a two-dimensional contour, or a spatial model, in particular a three-dimensional model, of the aircraft. The spatial location information relating to the object can therefore be determined based on the contour or the model of the aircraft. The contour may be an external outline or an outer contour of the aircraft. The model may be geometric modeling of the aircraft. A current location of the object or a current spatial orientation of the object can therefore be monitored based on the contour or the spatial model of the aircraft. It is also possible to determine, for example, whether the object is currently in a predefined safety area around the contour or the model of the aircraft or whether the object is moving toward said area. For this purpose, the safety area may be spanned by a distance to the contour or the model around the aircraft.

According to a further embodiment of the method, at least one of the communication devices has a position determination unit for determining at least one item of position-based information relating to the object and position-based information relating to the aircraft on the ground. At least one location or at least one position of the object and of the aircraft can therefore be determined in a superordinate coordinate system, for example in an airport system. Position-based information can be determined in a satellite-based or RFID-based manner. The position determination unit may have a receiver for a global navigation satellite system, for example a GNSS receiver or a GPS receiver, and/or an RFID sensor, for example an RFID transponder or an RFID reader. Furthermore, as an alternative or in addition to determining the relative position on the basis of the transmitted communication signal, the relative position of the object based on the aircraft on the ground can also be determined on the basis of the position-based information relating to the object and the aircraft.

According to a further embodiment of the method, the determining step comprises determining at least one distance between the at least one communication device spatially allocated to the aircraft on the ground and the communication device arranged on the object on the basis of the transmitted communication signal. If a multiplicity of communication devices are spatially allocated to the aircraft on the ground, a distance between a respective communication device spatially allocated to the aircraft on the ground and the communication device arranged on the object can be determined in each case. A multiplicity of corresponding distances can therefore be determined. The spatial location information relating to the object can therefore be determined on the basis of at least one determined distance or on the basis of a multiplicity of determined distances, for example by means of a spatial arc section.

A distance may be determined on the basis of a signal propagation time method or a ToF method. A distance may be determined, for example, on the basis of a captured signal propagation time of the communication signal between the communication devices. The determining step may therefore comprise determining a signal propagation time of the communication signal between the communication devices on the basis of a transmitting and receiving time of the transmitted communication signal, as determined at at least one of the communication devices. Spatial location information relating to the object can therefore be determined in a particularly reliable and precise manner.

According to a further embodiment of the method, the communication device arranged on the object and the at least one communication device spatially allocated to the aircraft on the ground each have a communication unit for communicating a position determination signal. The communication unit may be a position determination sensor. Furthermore, the two communication units may be a sensor pair or a multi-sensor system for determining the spatial location information relating to the object, for example the relative position of the object based on the aircraft on the ground.

The communication unit may be a near-field radio communication unit, in particular an ultra-wideband communication unit. The position determination signal may be an ultra-wideband radio signal. The ultra-wideband radio signal may have a modulated carrier frequency. According to one embodiment, the communication devices each have an ultra-wideband communication unit. The determination of the spatial location information relating to the object, for example the relative position of the object based on the aircraft on the ground, or a distance between ultra-wideband communication units can be determined on the basis of a signal propagation time method, for example a TDOA method. An ultra-wideband radio signal emitted and received by an ultra-wideband communication unit can be advantageously communicated in a wide bandwidth.

According to a further embodiment of the method, it has, as a further step, ascertaining a movement behavior of the object based on the aircraft on the ground on the basis of the determined spatial location information relating to the object. The ascertaining step may furthermore also be carried out on the basis of the determined at least one distance. The movement behavior of the object may have only information relating to whether or not the object is moving. Alternatively or additionally, the movement behavior of the object may have information relating to a direction of movement, a movement speed or/and a movement acceleration of the object. The direction of movement, the movement speed and/or the movement acceleration of the object may be a corresponding relative movement behavior of the object based on the aircraft on the ground. For example, a relative direction of movement based on the aircraft on the ground, a relative movement speed and/or a relative movement acceleration of the object can be determined. A potential collision of the object with the aircraft can be predicted or estimated on the basis of the ascertained movement behavior of the object. In a further step of the method, the occurrence or the presence of a collision can therefore also be documented. Furthermore, in a further step, a movement trajectory of the object can be derived from the ascertained movement behavior of the object. On the basis of the derived movement trajectory, it is therefore possible to ascertain whether the object is on a collision course with the aircraft on the ground. For this purpose, the ascertained trajectory can be blended, for example, with the contour or the model of the aircraft or their safety area around the aircraft. Moving objects can therefore be monitored in a particularly reliable manner.

According to a further embodiment of the method, the determining step and the ascertaining step are repeatedly carried out. These steps can therefore be carried out in a loop for the purpose of monitoring the object. The movement behavior of the object can therefore also be ascertained repeatedly based on the aircraft on the ground. In addition, the spatial location information relating to the object can be determined repeatedly, for example. The method may therefore comprise, as a further step, monitoring the repeatedly ascertained movement behavior of the object based on the aircraft on the ground on the basis of the repeatedly determined spatial location information relating to the object. The method may therefore comprise, as a further step, tracking the relative position of the object based on the aircraft on the basis of the determining and/or ascertaining steps which are carried out repeatedly. The spatial location information relating to the object can therefore be determined in (quasi-) real time.

According to a further embodiment of the method, it comprises, as a further step, allocating at least one communication device to the aircraft. The allocation may be semantic and/or spatial allocation. For example, it is possible to stipulate which aircraft or which aircraft type the at least one communication device is allocated to. Alternatively or additionally, it is possible to stipulate, for example, where the at least one communication device is arranged on the aircraft or at a distance from the latter in the allocation step. In a further step, the semantic and/or spatial allocation may be stored in a monitoring device for the purpose of avoiding or documenting a collision between the object and the aircraft on the ground. On the basis of such spatial and/or semantic allocation of the at least one communication device to the aircraft, the determined spatial location information relating to the object can then be assigned to the current spatial location information relating to the aircraft on the ground and/or to the predetermined geometry model of the latter on the basis of the transmitted communication signal.

According to a further embodiment of the method, the step of allocating the at least one communication device to the aircraft may therefore also comprise an arranging operation on the basis of a predefined spatial allocation and/or detection of a predefined spatial allocation of the at least one communication device to a predetermined aircraft. The predefined spatial allocation may comprise the relative spatial allocation information relating to the at least one communication device spatially allocated to the aircraft on the ground with respect to the aircraft. The allocation step may therefore comprise arranging the at least one communication device spatially allocated to the aircraft on the ground on the aircraft in a predefined spatial location relative to the aircraft. An arrangement position of the at least one communication device on or at a distance from the aircraft may therefore be automatically derived in or on the basis of the allocation step. The at least one communication device spatially allocated to the aircraft on the ground may therefore be arranged, for example, at a predefined location on a means for securing the parked position of the aircraft, for example a chock, or a means for protecting an aircraft component, for example a turbine inlet cover.

According to a further embodiment, the communication device arranged on the object and the communication device spatially allocated to the aircraft on the ground each have an activation unit for communicating an activation signal. An activation signal emitted or communicated by the activation unit of the communication device arranged on the object may be received by an activation unit of a communication device spatially allocated to the aircraft on the ground. The method may therefore comprise, in a further step, communicating an activation signal between the activation units. At least one communication unit of the communication devices, in particular the communication unit of the communication device spatially allocated to the aircraft on the ground, can be activated on the basis of the communicated activation signal. The communication unit of the communication device arranged on the object may alternatively also be activated on the basis of the communicated activation signal. The activation signal may therefore be communicated between the activation units in order to activate at least one communication unit or all communication units.

The activation unit may be a radio communication unit. The activation unit may have a position determination sensor. The activation unit may access a position of the object and/or of the aircraft determined using the position determination sensor in order to emit the activation signal on the basis thereof or to use it to transmit information relating to the determined position of the object and/or of the aircraft between the communication devices of the object and/or the aircraft.

The activation unit may be a sub-GHz activation unit. The activation signal may be a sub-GHz radio signal. The sub-GHz radio signal may be emitted and received in a narrow band. In comparison with an ultra-wideband radio signal, the sub-GHz radio signal can be generated and emitted in a greater range and with a lower energy requirement.

The transmitting step can therefore be carried out on the basis of the communicated activation signal. The communication unit of the communication device arranged on the object and/or the at least one communication unit of the at least one communication device spatially allocated to the aircraft on the ground may be initially in a deactivated state, wherein no communication signal or position determination signal is transmitted between the communication devices in the deactivated state. If the communication units of the communication devices are activated on the basis of a communicated activation signal, the communication signal or the position determination signal can then be communicated between the communication units of the communication devices as the next step. Activation of the communication units by the activation units and/or the transmission of the communication signal on the basis thereof may therefore be carried out on the basis of the activation signal for activating the communication units having been communicated. The activation signal may in turn be communicated only on the basis of how far away the object is in the environment of the aircraft. A relative location or a relative position of the object based on the aircraft may be carried out using sensors, for example on the basis of respective satellite positioning or in an RFID-based manner. If the object approaches the aircraft and/or if the object stays in a monitoring area around the aircraft, the activation signal can be communicated. The activation or waking-up of the communication units on the basis of an activation signal communicated in this manner can reduce the energy consumption of the communication units.

According to a further embodiment, the activation signal has spatial location information relating to the object in a superordinate coordinate system. The spatial location information relating to the object that is communicated with the activation signal can be compared with predetermined spatial location information relating to the aircraft in the superordinate coordinate system. It is therefore possible to determine whether the object is in the monitoring area around the aircraft. The spatial location information may have current positions of the object and of the aircraft in a local or superordinate coordinate system, wherein the positions may each be captured in a satellite-based or RFID-based manner. On the basis of the positions, a relative position or a distance between the object and the aircraft can be derived and compared with a predetermined corresponding threshold value. The transmitting step can therefore also be carried out on the basis of whether a current distance between the object and the aircraft falls below a predetermined corresponding threshold value.

According to a further embodiment, the aircraft on the ground is in a parked position when carrying out the method. The aircraft may therefore be parked on an apron of an airport. In this case, the aircraft is stationary.

According to a further embodiment of the method, the at least one communication device spatially allocated to the aircraft on the ground is fitted to an object separate from the aircraft. The object may be a means for securing a parked position of the aircraft. For example, the means for securing a parked position of the aircraft is a chock for securing a chassis or a wheel of the aircraft in the parked position. The object may be a means for protecting an aircraft component. For example, the means for protecting an aircraft component is a turbine inlet cover. The at least one communication device spatially allocated to the aircraft on the ground may be preassembled on the means for securing a parked position of the aircraft and/or on the means for protecting an aircraft component. The means for securing a parked position of the aircraft and/or the means for protecting an aircraft component may also be temporarily provided with the communication device in order to carry out the method.

According to a further embodiment, the at least one communication device spatially allocated to the aircraft on the ground can be operated in an autonomous manner in terms of energy. The communication device spatially allocated to the on the ground may be in the form of a battery-operated communication device. The communication device may therefore have a battery or a rechargeable battery which can be used to supply the communication device with energy. The communication unit and/or the activation unit of the communication device can therefore be advantageously operated in an autonomous manner in terms of energy in order to monitor objects in the environment of the aircraft.

According to a further embodiment, the method comprises, as a further step, communicating an information signal based on the determined spatial location information relating to the object to a monitoring device for the purpose of avoiding or documenting a collision between the object and the aircraft on the ground. Damage which is possibly produced by the documented collision can then be examined and/or eliminated in a further step on the aircraft. At least contact between the object and the aircraft may be present during the collision. The communicated information signal may also be based on the ascertained movement behavior of the object. The monitoring device may be a device, in particular a mobile terminal, for example a smartphone or a tablet PC, which communicates with at least one of the communication devices described. The monitoring device may also be an online service or a web service for monitoring the object. The monitoring device may carry out or cause at least one further step in order to avoid or document a collision between the object and the aircraft on the ground. The monitoring device may therefore be a collision avoidance and/or collision documentation device. The method may therefore also be carried out for the purpose of avoiding or documenting a collision between the object and the aircraft on the ground. The method may furthermore be carried out for the purpose of avoiding damage which may be produced on the aircraft as a result of a potential collision of the object with the aircraft on the ground.

According to a further embodiment, the method comprises, as a further step, intervening in the operation of the object on the basis of the determined spatial location information relating to the object in order to avoid a collision between the object and the aircraft on the ground. This step can be carried out by the monitoring device. It is also possible to intervene in the operation of the object on the basis of the ascertained movement behavior of the object. Intervention in the operation of the object may comprise intervening in a dynamics system for controlling the movement of the object. Alternatively or additionally, intervention in the operation of the object may comprise intervening in an assistance system for operating the object. Further alternatively or additionally, intervention in the operation of the object may comprise intervening in a warning system for warning the object or an operator of the object of a potential collision between the object and the aircraft on the ground.

According to a further embodiment, the method comprises, as a further step, triggering a warning signal on the basis of the determined spatial location information relating to the object in order to warn of a potential collision between the object and the aircraft on the ground. The warning signal can be communicated with the object or triggered on the object. The monitoring device may be configured to trigger or communicate the warning signal. For this purpose, the monitoring device may communicate with a warning device which is present on the object and can trigger or emit the warning signal. Triggering or emitting the warning signal by means of the warning device or communicating with the latter for this purpose may also be understood as meaning exemplary intervention in the operation of the object. If the object is a vehicle, a driver, or an operator or user of the vehicle in the case of an autonomous vehicle, for example, can be warned of a potential collision between the object and the aircraft on the ground.

According to a further embodiment of the method, it comprises, as a further step, establishing, on the basis of the determined spatial location information relating to the object, whether a collision will take place or has taken place between the object and the aircraft on the ground. As an alternative or in addition to avoiding a collision, the method may therefore also be carried out for the purpose of documenting or establishing a collision which is taking place or has already taken place between the object and the aircraft on the ground. A collision and/or damage to the aircraft resulting therefrom can therefore be detected using the invention even though the collision and/or the damage to the aircraft resulting therefrom cannot be detected by means of a surface damage inspection of said aircraft. This is based on the knowledge that collision damage to an aircraft can be produced only in material areas which cannot be seen on the surface of the aircraft, for example the fuselage outer surface. This may be the case, in particular, for the composite materials used in aircraft fuselages.

The method may comprise, as a further step, determining a collision location on the aircraft if a collision between the object and the aircraft has been established. The step of determining the collision location may be carried out on the basis of the determined spatial location information relating to the object. The step of determining the collision location may also be carried out on the basis of the current spatial location information relating to the aircraft on the ground and/or the predetermined geometry model of the latter. A collision location of damage which cannot be seen on the surface or on the outer contour of the aircraft can therefore be advantageously detected and documented using the method in order to uncover damage which is concealed in this manner and may be relevant to safety for operating the aircraft and to eliminate it before the aircraft is moving or is operating in the air again.

In a further aspect, the invention relates to a device which is configured to communicate with at least one communication device arranged on an object and at least one communication device allocated, in particular spatially and/or semantically allocated, to an aircraft on the ground. The object may be a land vehicle. The device may be a collision avoidance device for avoiding a collision or a collision warning device for warning of a collision. Alternatively or additionally, the device may be a collision documentation device. The device may be configured to cause a communication signal to be transmitted between the communication devices. The device may be a mobile terminal, for example a smartphone or a tablet PC. The device may be a portable device. Any embodiment described with respect to the preceding aspect or any feature described with respect to the preceding aspect can be understood as meaning a corresponding embodiment or a corresponding feature of the device according to this aspect, and vice versa.

The device may have an interface which is configured to read in data which may be based on the communication signal transmitted between the communication devices. As an alternative or in addition to this interface, the device may have at least one further interface which may be configured to read in and/or output data based on the performance of at least one of the method steps described with respect to the preceding aspect.

The device may have a determination unit which may be configured to determine spatial location information relating to the object on the basis of the data which have been read in. As an alternative or in addition to the determination unit, the device may have at least one further unit which may be configured or acts to carry out at least one of the method steps described with respect to the preceding aspect.

In a further aspect, the invention relates to a system for monitoring an object in the environment of an aircraft on the ground. The system may be a collision avoidance system for avoiding a collision or a collision warning system for warning of a collision. Alternatively or additionally, the system may be a collision documentation system. Any embodiment described with respect to the preceding aspects or any feature described with respect to the preceding aspects can be understood as meaning a corresponding embodiment or a corresponding feature of the system according to this aspect, and vice versa. The system may be a portable system.

As a system component, the system may have at least one communication device which can be allocated to the aircraft on the ground and may be configured to communicate with a communication device arranged on the object. The object may be a land vehicle. The system may have, as a further system component, the communication device arranged on the object. As a further system component, the system has a device according to the preceding aspect.

Furthermore, the system may have any further object described with respect to one of the preceding objects or any device, for example the warning device described with respect to the preceding aspect of the method. The system may also be configured to carry out at least one of the method steps described with respect to the aspect of the method.

According to one embodiment of the system, the at least one communication device which can be allocated to the aircraft on the ground is in the form of a portable system component. The communication device may therefore be handled by an operator, for example the ground staff of an airport, without additional aids. The communication device may also be allocated to an aircraft without tools. Furthermore, it is conceivable for the communication device to be able to be remotely controlled by the operator. The operator may be a person or a robot.

DETAILED DESCRIPTION

Figure 1:
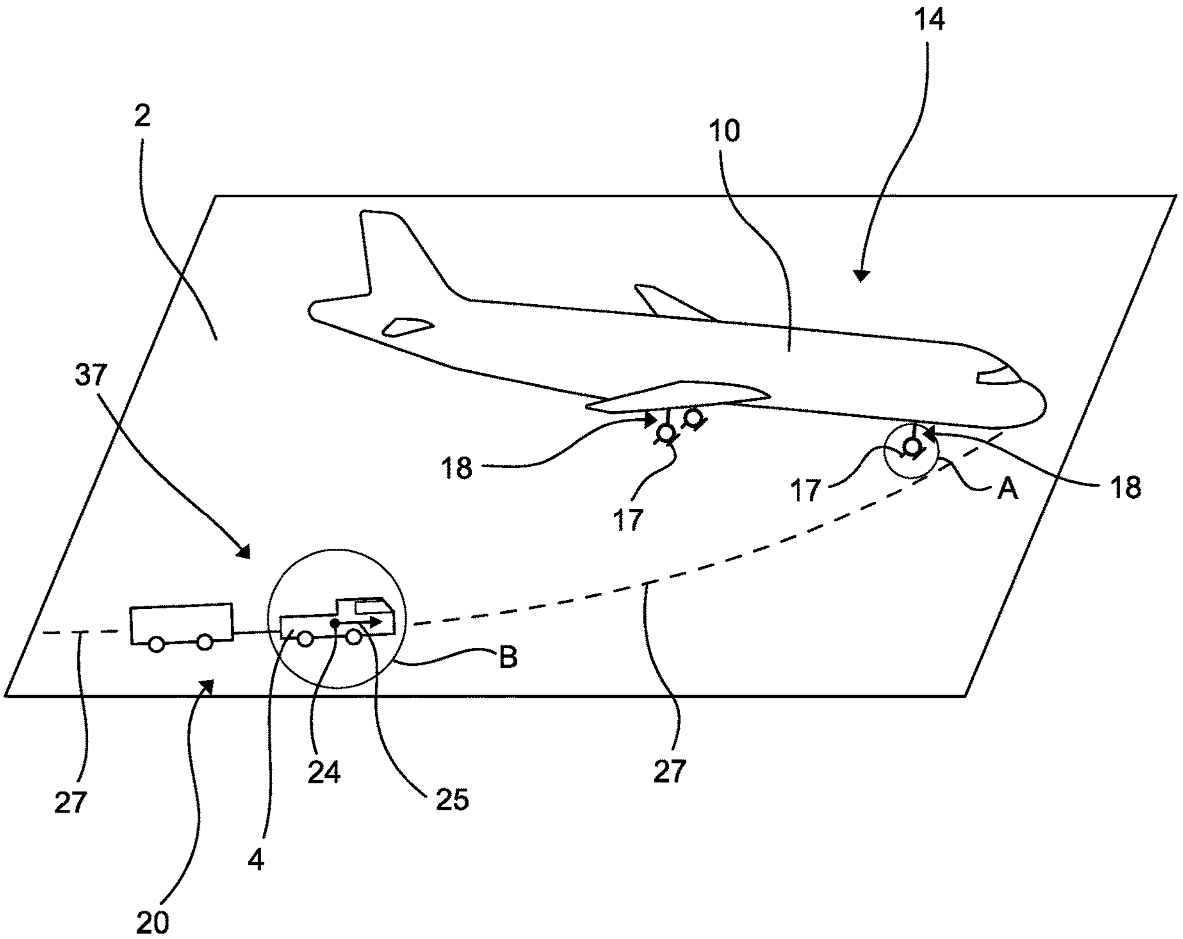
FIG. 1 shows an aircraft and an object for explaining the invention.

FIG. 1 shows an aircraft 10 on the ground 2. In one embodiment, the aircraft 10 may be an airplane which may be on an apron of an airport in a parked position 14. The aircraft 10 is currently in a position of rest, for example in such a parked position 14, on the ground 2. In order to secure the parked position 14, means for securing a parked position 14 may be arranged on the chassis 18 of the aircraft 10. The means for securing the parked position 14 may be chocks 17. In one embodiment, the chocks 17 may be arranged on wheels of an airplane.

An object 20 which may be moving is the environment of the aircraft 10 on the ground 2. In one embodiment, the object 20 may be an apron vehicle 4. At least one trailer for transporting goods or persons may be attached to the apron vehicle 4. The object 20 may move along a movement trajectory 27 on the ground 2. In this case, the object 20 may be on a collision course with the aircraft 10. In one embodiment, the object 20 may therefore collide with a fuselage of the aircraft 10. With respect to the aircraft 10, the object 20 has a relative position 24 which can define a position of the object 20, in particular along the movement trajectory 27, based on the aircraft 10. In addition, the object 20 may have a direction of movement 25 which can define a direction tangential to the movement trajectory 27. Alternatively, the direction of movement 25 of the object 20 may also define a relative orientation of the object 20 with respect to the aircraft 10 and, in particular, based on a reference direction in a reference system based on the aircraft 10.

Based on a potential collision of the object 20 with the aircraft 10, the object 20 is in an uncritical object position 37 in the situation shown in FIG. 1. In this case, the object 20 may be outside a safety area not shown in the figures. The safety area may be formed or spanned at a distance from the outer contour of the aircraft 10. For example, the safety area may be formed by a projection of the outer contour of the aircraft 10 onto the ground 2 and a selected distance around the aircraft 10.

Figure 2:
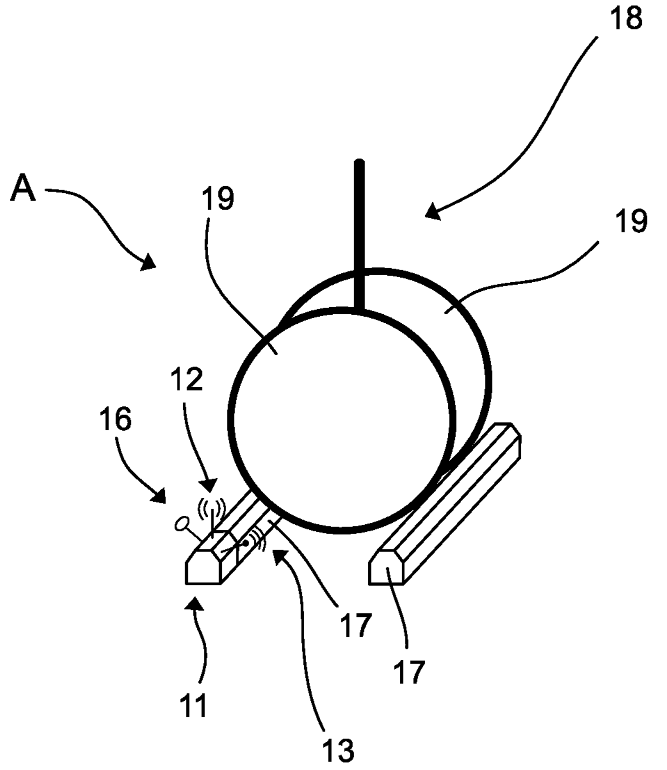
FIG. 2 shows a communication device allocated to the aircraft for further explanation of the invention.

FIG. 2 illustrates the area on the aircraft 10, which is indicated by A in FIG. 1, in more detail. FIG. 2 shows a chassis component of the chassis 18, on which a means for securing a parked position 14 is arranged. In one embodiment, the chassis component is at least one wheel 19 of the chassis 18. Two chocks 17 are arranged in pairs on the wheel 19 in one embodiment. Rolling of the aircraft 10 can therefore be avoided.

FIG. 2 also shows a communication device 11 allocated to the aircraft 10 on the ground 2. The communication device 11 is spatially allocated to the aircraft 10 via its arrangement position on the aircraft 10. The arrangement position may therefore be a relative arrangement position relative to the aircraft 10 based on the latter. The arrangement position of the communication device 11 may be geometrically defined via the chassis component and/or the means for securing a parked position 14. The arrangement position of the communication device 11 on the aircraft 10 can therefore be spatially defined relative to the aircraft 10 via at least one of a predefined dimension of the chassis component, the location of the chassis component on the aircraft 10, a dimension of the means for securing the parked position 14. The position of the communication device 11 may thus be defined in a coordinate system based on the aircraft 10.

The communication device 11 may have, as a communication unit, an ultra-wideband communication unit 12. The communication device 11 may have, as an activation unit, a sub-GHz activation unit 13. The communication device 11 may also have a position determination unit 16. The communication device 11 may also have a battery, not shown in the figures, for supplying power to the communication device 11.

Figure 3:
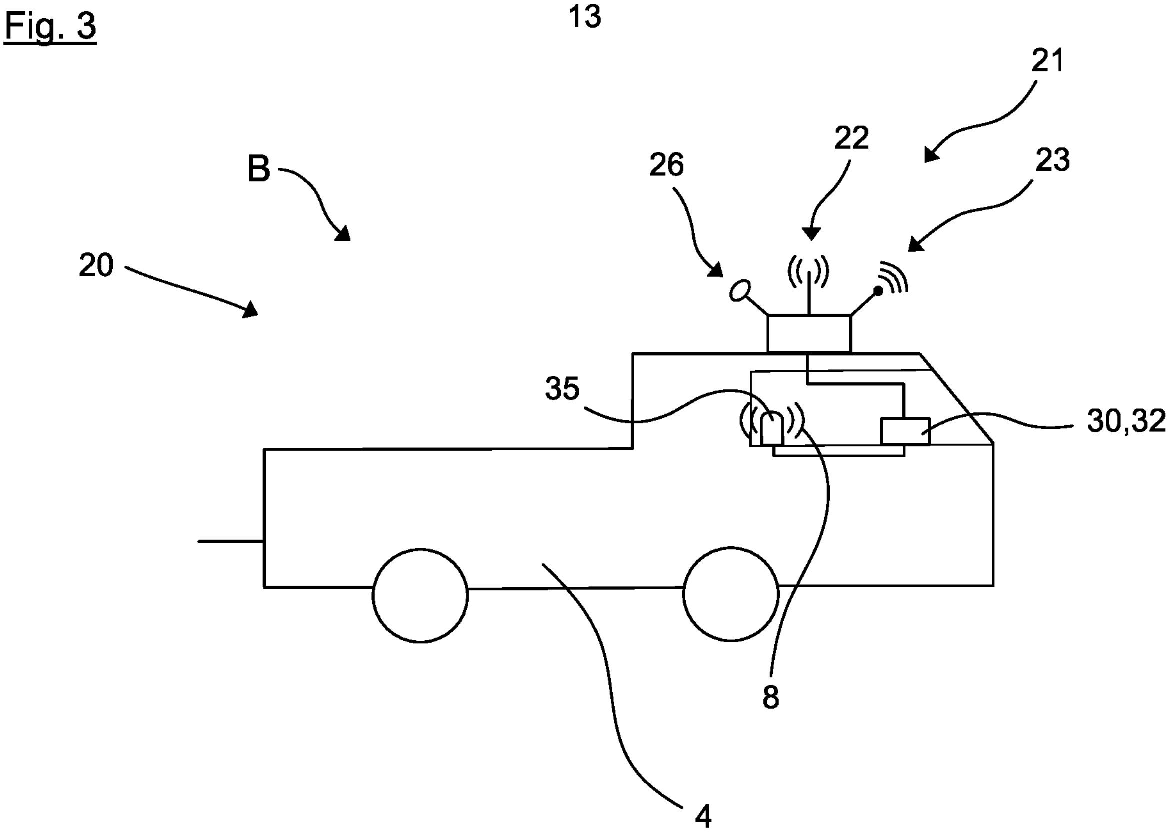
FIG. 3 shows a communication device arranged on the object for further explanation of the invention.

FIG. 3 shows the object 20 in the area B indicated in FIG. 1 in more detail. A further communication device 21 is arranged on the object 20. The further communication device 21 may be designed like the communication device 11 described with respect to FIG. 2. The further communication device 21 may have, as a communication unit, an ultra-wideband communication unit 22. This may communicate with the ultra-wideband communication unit 12 of the communication device 11 allocated to the aircraft 10. The further communication device 21 may have, as an activation unit, a sub-GHz activation unit 23 which can communicate with the sub-GHz activation unit 13 of the communication device 11 allocated to the aircraft 10. The further communication device 21 may have a position determination unit 26 which can be designed like the position determination unit 16 of the communication device 11 allocated to the aircraft 10. According to one embodiment, the position determination units 16, 26 are a respective GNSS receiver.

A device 30 for communicating with at least one of the two communication devices 11, 21 may be arranged on the object 20. The device 30 may be connected to the at least one communication device 11, 21 in a wired or radio-based manner. In one embodiment, the device 30 is connected to the communication device 21 arranged on the object 20. The device 30 may be a mobile terminal 32 which can be carried on the object 20. Alternatively, the device 30 may also be permanently arranged on the object 20.

The device 30 may be connected to a warning device 35 for warning of a potential collision of the object 20 with the aircraft 10. This may be a wired or a radio-based connection. The warning device 35 may emit a warning signal 8 which can warn of a potential collision of the object 20 with the aircraft 10. In one embodiment, the warning device 35 may be a visual warning device 35 which can emit a visual warning signal 8. If the object 20 is an apron vehicle 4, a warning light, for example, may be arranged, as a warning device 35, on the apron vehicle 4 and may warn a driver or operator, not shown in the figures, of the apron vehicle 4 of the potential collision by means of a light signal.

Figure 4:
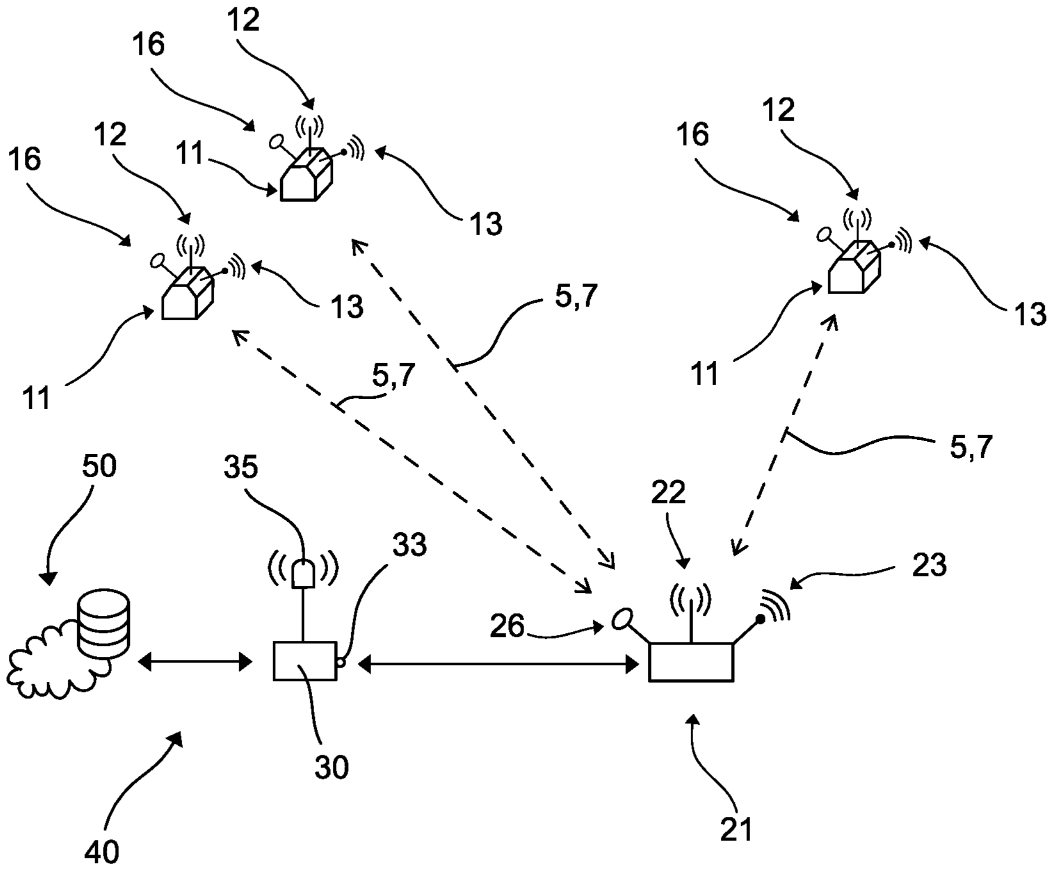
FIG. 4 shows a system, a device and communication devices according to respective embodiments of the invention.

FIG. 4 shows a system 40 for monitoring the object 20 which is in the environment of the aircraft 10 on the ground 2 according to one embodiment of the invention. The system 40 has at least one communication device 11 which can be allocated to the aircraft 10 on the ground 2. In the embodiment shown, the system 40 has at least three communication devices 11 of this type. The at least one communication device or the at least three communication devices 11 may be designed like the communication device 11 described with respect to FIG. 2. In this case, each communication device 11 may have a respective ultra-wideband communication unit 12, a sub-GHz activation unit 13 and an optional position determination unit 16.

The system 40 may have a communication device 21 which is arranged on the object 20 not shown in FIG. 4 and may be designed as described with respect to FIG. 3. The communication device 21 may also have an ultra-wideband communication unit 22, a sub-GHz activation unit 23 and an optional position determination unit 26.

On the basis of relative positions 24 or distances between the position determination units 16, 26, as ascertained using the position determination units 16, 26, a current distance between the aircraft 10 and the object 20 can be determined. On the basis of the determined current distance, the sub-GHz activation unit 23 of the communication device 21 arranged on the object 20 may emit an activation signal which may have a sub-GHz radio signal 7. The sub-GHz radio signal 7 may be received by the sub-GHz activation units 13 of the communication devices 11 allocated to the aircraft 10. The ultra-wideband communication units 12 of the communication devices 11 allocated to the aircraft 10 can then be activated. They may be deactivated beforehand. The ultra-wideband communication units 12 of the communication devices 11 allocated to the aircraft 10 can then communicate with the ultra-wideband communication unit 22 of the communication device 21 arranged on the object 20 using an ultra-wideband radio signal 5. The respective ultra-wideband radio signal 5 transmitted between the ultra-wideband communication units 12, 22 can be used to determine spatial location information relating to the object 20 on the basis of the transmitted ultra-wideband radio signal 5. In particular, this can be carried out on the basis of a signal propagation time of the communicated ultra-wideband radio signal 5.

On the basis of the respective arrangement position of the communication devices 11 on the aircraft 10 not shown in FIG. 4 and a respective distance determination between a respective communication device 11 allocated to the aircraft 10 and the communication device 21 arranged on the object 20, it is possible to determine the position of the communication device 21 arranged on the object 20 and therefore the position of the object 20 in a coordinate system based on the aircraft 10. For this purpose, the distance determination may be based on evaluated ultra-wideband radio signals 5. On the basis of the determined distances, the position determination may also be carried out, for example, using a spatial arc section based on the distance determinations. In order to resolve ambiguities and in order to carry out three-dimensional position determination, at least three distances may be necessary for this purpose. A current location of the object 20 based on the aircraft 10 can therefore be determined as a relative position 24 of the object 20 based on the aircraft 10.

The relative position 24 of the object 20 can be communicated using the device 30 via an interface 33. On the basis of a relative position 24 which has been read in by the device 30 via the interface 33, this device can establish, in an establishment unit of the device 30 that is not shown in the figures, whether the relative position 24 is an uncritical object position 37 shown in the (starting) situation from FIG. 1 or a critical object position 38 shown in FIG. 5. If it is a critical object position 38 in which the object 20 is within the safety area around the aircraft 10, the device 30 may communicate with the warning device 35 so as to cause the warning device 35 to output the warning signal 8 for warning of a potential collision between the object 20 and the aircraft 10.

The device 30 can also communicate the relative position 24 using a web service 50. The device 30 can communicate with the web service 50 by means of mobile radio, for example. The web service 50 may be part of the device 30 or vice versa. The web service 50 or the device 30 can store and/or further evaluate the determined relative position 24. For example, the movement trajectory 27 shown in FIG. 1 can therefore be inferred or predicted on the basis of repeatedly determined relative positions 24.

Figure 5:
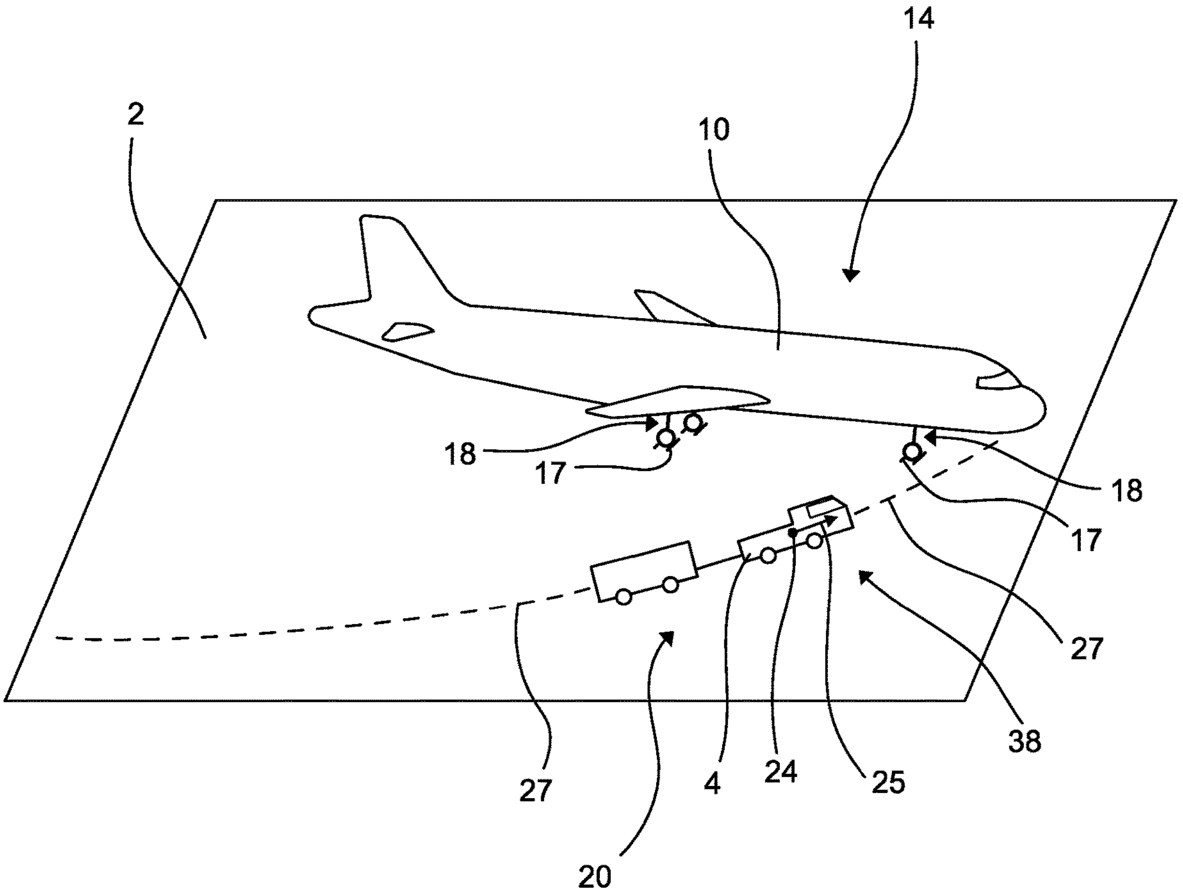
FIG. 5 shows the aircraft and the object before a collision for further explanation of the invention.

In FIG. 5, the object 20 has moved further toward the aircraft 10 along the movement trajectory 27 in comparison with its starting location shown in FIG. 1. In its current location, the object 20 has a critical object position 38 based on the aircraft 10. As described with respect to FIG. 4, this is determined on the basis of the ultra-wideband radio signals 5 communicated between the communication devices 11, 21. In the situation shown in FIG. 5, the warning signal 8 shown in FIG. 3 can be emitted by the warning device 35 in order to warn of a still imminent collision of the object 20 with the aircraft 10.

Figure 6:
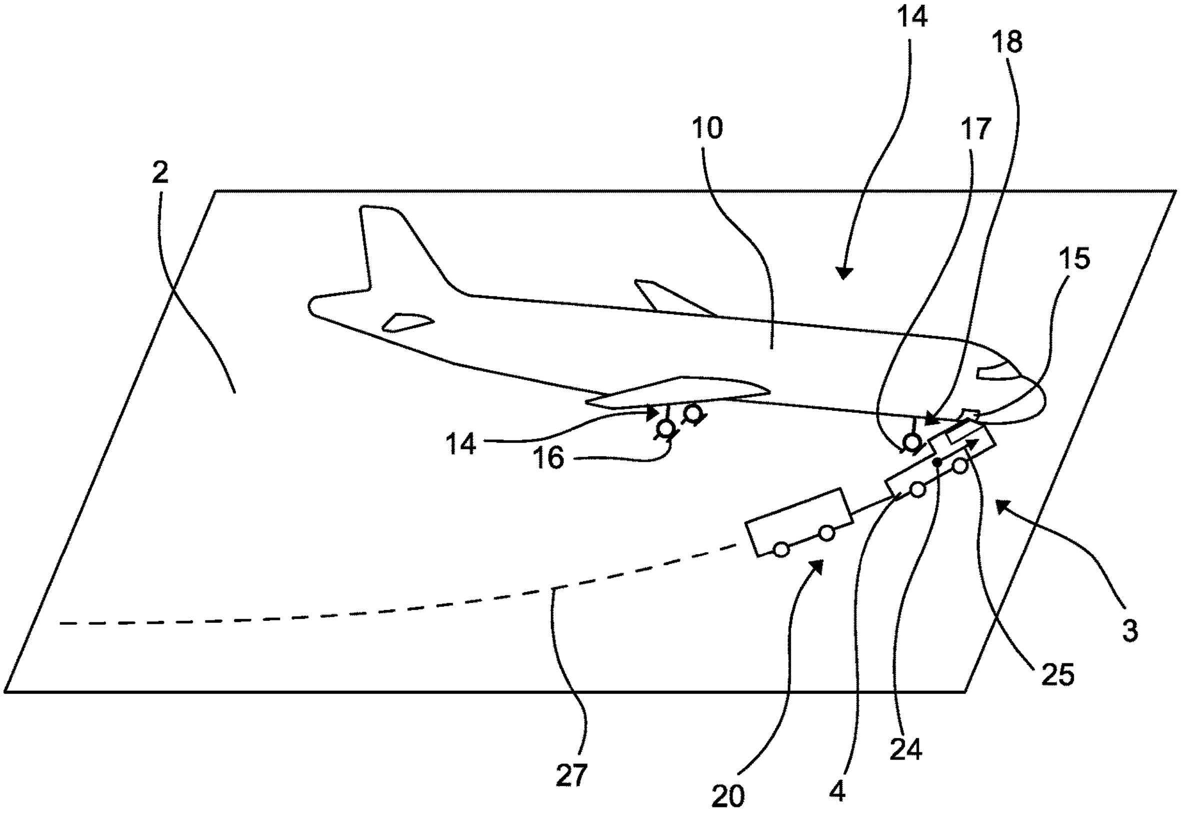
FIG. 6 shows the aircraft and the object during a collision for further explanation of the invention.

FIG. 6 shows a collision 3 between the object 20 and the aircraft 10. The object 20 has moved further on the determined movement trajectory 27, in which case it has now arrived at a collision location 15 on the aircraft 10, for example at a location on the fuselage of the aircraft 10, and collides there with the aircraft 10. On the basis of the determination of the position of the object 20, as described with respect to FIG. 4, the collision location 15 on the aircraft 10 can be derived and communicated using the device 30 or the web service 50. The collision location 15 can thus be documented in order to document a damaged area on the aircraft 10. If there is damage which is caused by the collision 3 in the damaged area and cannot be seen on the surface, for example inside a composite material in the fuselage, this can be uncovered on the basis of the documented collision location 15 and eliminated before the aircraft 10 leaves its parked position 14. Damage which cannot be seen on the surface can therefore be efficiently located and eliminated.

According to a respective embodiment of the method, it is therefore possible to warn of a collision 3, on the one hand, and alternatively or additionally to document a collision 3 which has taken place, on the other hand. The system 40 can therefore be a collision avoidance and/or collision detection system.

Figure 7:
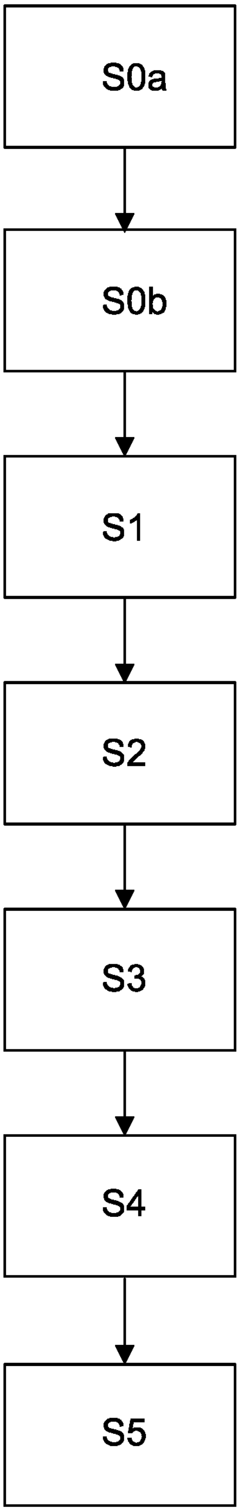
FIG. 7 shows a schematic flowchart with method steps of a method for monitoring an object in the environment of an aircraft according to one embodiment of the invention.

FIG. 7 shows method steps of a method for monitoring the object 20 in the environment of the aircraft 10 on the ground 2 in a sequence according to one embodiment.

In a first step S0*a*, a communication device allocation can be carried out. In this step, as described with respect to FIG. 2, a communication device 11 can be spatially allocated to the aircraft 10. For this purpose, the communication device 11 may be fitted to a means for securing a parked position 14 of the aircraft 10, which means can therefore be arranged in a known arrangement position relative to the aircraft 10. Therefore, a spatial relationship between the communication device 11 and the aircraft 10 can be determined. The communication device 11 can be additionally semantically allocated to the aircraft. In this case, the communication device 11 may be assigned to a particular aircraft type. A fitting position or allocation position of the communication device 11 can therefore be automatically derived on the basis of a known model of the corresponding aircraft type. In addition, it is also possible to automatically derive the relative position 24 of a communication apparatus 11 allocated to the aircraft 10 based on the aircraft 10.

The communication unit of the communication device 11 allocated to the aircraft 10, in one embodiment the ultra-wideband communication unit 12, may initially be deactivated. If an object 20 approaches the aircraft 10, activation communication can be carried out in a further step S0*b*. In this step, the activation units 13, 23 can communicate with one another in order to cause the deactivated communication unit of the communication device 11 allocated to the aircraft 10 to be activated. Activating the communication unit makes it possible to reduce the energy requirement of the communication device 11 which can be operated in an autonomous manner in terms of energy according to one embodiment. The activation signal for activating the communication device 11 can be emitted only when the object 20 is in the critical object position 38 shown in FIG. 5 or inside the safety area. The critical object position 38 can be derived from a respective position determination by the position determination units 16, 26. According to one embodiment, the position determination units 16, 26 may be GNSS receivers.

On the basis of the activated communication unit of the communication device 11 allocated to the aircraft 10, communication signal transmission can be carried out in a further step S1. In this step, ultra-wideband radio signals 5 can be communicated between the communication units or the ultra-wideband communication units 12, 22 of the communication devices 11, 21, as described with respect to FIG. 4. On the basis of such transmission of radio signals between the communication device 21 arranged on the object 20 and the communication devices 11 spatially allocated to the aircraft 10 on the ground 2, it is possible to determine a relative position 24 of the object 20 based on the aircraft 10. A location information determination can therefore be carried out in a further step S2, wherein the relative position 24 of the object 20 can be determined as spatial location information relating to the object 20.

If steps S1 and S2 are carried out repeatedly or continuously, the relative position 24 of the object 20 based on the aircraft 10 can therefore be continuously determined and the movement trajectory 27 shown in FIGS. 1, 5 and 6 can be derived therefrom. Monitoring the relative position 24 of the object 20 with respect to the aircraft 10 can therefore comprise deriving and predicting a movement trajectory 27 of the object 20. Therefore, a movement behavior ascertainment can be carried out in a further step S3. The object 20 can therefore be dynamically monitored. In this step, it is possible to establish whether the object 20 leaves the safety area again or is no longer on a collision course with the aircraft 10.

In a further step S4, information signal communication can be carried out using the device 30 or the web service 50. On the basis of an information signal communicated between the communication device 21 arranged on the object 20 and the device 30, the device 30 can then communicate with the warning device 35 in order to trigger a warning signal 8.

In a further step S5, an operating intervention can be carried out on the object 20 in order to prevent a potential collision of the object 20 with the aircraft 10. For example, such an operating intervention may comprise triggering the warning signal 8 on the object 20. Alternatively or additionally, the operating intervention may comprise an intervention in the dynamics of the object 20, an intervention in the driving dynamics of the apron vehicle 4 in the embodiment shown. As an alternative or in addition to the operating intervention, the collision 3 which has taken place in FIG. 6 may be stored or documented, in which case this can be carried out by the web service 50.

REFERENCE SIGNS

2 Ground
3 Collision
4 Apron vehicle
5 Ultra-wideband radio signal
7 Sub-GHz radio signal
8 Warning signal
10 Aircraft
11 Communication device
12 Ultra-wideband communication unit
13 Sub-GHz activation unit
14 Parked position
15 Collision location
16 Position determination unit
17 Chock
18 Chassis
19 Wheel
20 Object
21 Communication device
22 Ultra-wideband communication unit
23 Sub-GHz activation unit
24 Relative position
25 Direction of movement
26 Position determination unit
27 Movement trajectory
30 Device
32 Mobile terminal
33 Interface
35 Warning device
37 Uncritical object position
38 Critical object position
40 System
50 Web service
S0*a* Communication device allocation
S0*b* Activation signal communication
S1 Communication signal transmission
S2 Location information determination
S3 Movement behavior ascertainment
S4 Information signal communication
S5 Operating intervention

What is claimed is:

1. A method for monitoring an object in the environment of an aircraft on the ground, having the steps of:

transmitting a communication signal between a communication device arranged on the object, in particular a land vehicle, and at least one communication device spatially allocated to the aircraft on the ground, and wherein the at least one communication device spatially allocated to the aircraft on the ground is fitted to an object separate from the aircraft, determining spatial location information relating to the object on the basis of the transmitted communication signal.

2. The method as claimed in claim 1, wherein the determining step comprises determining relative spatial location information relating to the object, in particular a relative position of the object, based on the aircraft on the ground on the basis of the transmitted communication signal.

3. The method as claimed in claim 1, wherein the determining step is carried out on the basis of current spatial location information relating to the aircraft on the ground and/or on the basis of a predetermined geometry model of the aircraft on the ground.

4. The method as claimed in claim 1, wherein at least one of the communication devices has a position determination unit for determining at least one item of position-based information relating to the object and position-based information relating to the aircraft on the ground.

5. The method as claimed in claim 1, wherein the determining step comprises determining at least one distance between the at least one communication device allocated to the aircraft on the ground and the communication device arranged on the object on the basis of the transmitted communication signal.

6. The method as claimed in claim 1, wherein the communication device arranged on the object and the at least one communication device spatially allocated to the aircraft on the ground each have a communication unit, in particular an ultra-wideband communication unit, for communicating a position determination signal, in particular an ultra-wideband radio signal.

7. The method as claimed in claim 1, having the further step of:

ascertaining a movement behavior of the object based on the aircraft on the ground on the basis of the determined spatial location information relating to the object.

8. The method as claimed in claim 7, wherein the determining step and the ascertaining step are repeatedly carried out, and having the further step of:

monitoring the repeatedly ascertained movement behavior of the object based on the aircraft on the ground on the basis of the repeatedly determined spatial location information relating to the object.

9. The method as claimed in claim 1, having the further step of:

allocating, in particular semantically allocating, at least one communication device to the aircraft.

10. The method as claimed in claim 1, wherein the communication device arranged on the object and the communication device spatially allocated to the aircraft on the ground each have an activation unit, in particular a sub-GHz activation unit, having the further step of: communicating an activation signal, in particular a sub-GHz radio signal, between the activation units, wherein the transmitting step is carried out on the basis of the communicated activation signal.

11. The method as claimed in claim 1, wherein the aircraft on the ground is in a parked position when carrying out the method.

12. The method as claimed in claim 1, wherein the at least one communication device spatially allocated to the aircraft on the ground can be operated in an autonomous manner in terms of energy and is, in particular, in the form of a battery-operated communication device.

13. The method as claimed in claim 1, having the further step of:

communicating an information signal based on the determined spatial location information relating to the object to a monitoring device for the purpose of avoiding or documenting a collision between the object and the aircraft on the ground.

14. The method as claimed in claim 1, having the further step of:

intervening in the operation of the object on the basis of the determined spatial location information relating to the object in order to avoid a collision between the object and the aircraft on the ground.

15. The method as claimed in claim 1, having the further step of:

triggering a warning signal, in particular on the object, on the basis of the determined spatial location information relating to the object in order to warn of a potential collision between the object and the aircraft on the ground.

16. The method as claimed in claim 1, having the further step of:

establishing, on the basis of the determined spatial location information relating to the object, whether a collision will take place or has taken place between the object and the aircraft on the ground, and in particular determining a collision location on the aircraft if a collision between the object and the aircraft has been determined.

17. A device, in particular a mobile terminal, which is configured to communicate with at least one communication device arranged on an object, in particular a land vehicle, and at least one communication device allocated to an aircraft on the ground in order to cause a communication signal to be transmitted between the communication devices, and wherein the device has an interface which is configured to read in data based on the communication signal transmitted between the communication devices, and wherein the device has a determination unit which is configured to determine spatial location information relating to the object on the basis of the data which have been read in.

18. A system for monitoring an object in the environment of an aircraft on the ground, having the following system components:

at least one communication device which can be allocated to the aircraft on the ground and is configured to communicate with a communication device arranged on the object, in particular a land vehicle, and the device, in particular a mobile terminal, which is configured to communicate with at least one communication device arranged on an object, in particular a land vehicle, and at least one communication device allocated to an aircraft on the ground in order to cause a communication signal to be transmitted between the communication devices, and wherein the device has an interface which is configured to read in data based on the communication signal transmitted between the communication devices, and wherein the device has a determination unit which is configured to determine spatial location information relating to the object on the basis of the data which have been read in.

19. The system as claimed in claim 18, wherein the at least one communication device which can be allocated to the aircraft on the ground is in the form of a portable system component.

* * * * *